No. 774,216. PATENTED NOV. 8, 1904.
A. F. WARD.
MACHINE FOR POINTING AND LAPPING HOOPS.
APPLICATION FILED NOV. 19, 1903.
NO MODEL. 6 SHEETS—SHEET 3.
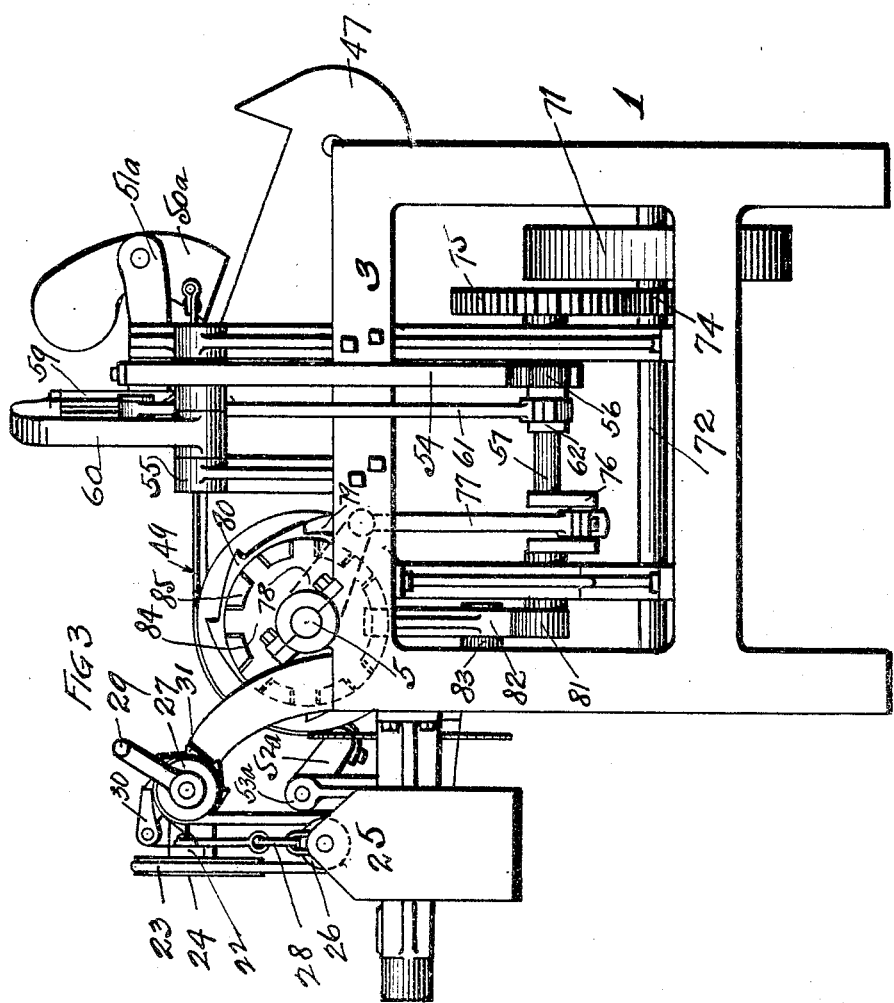

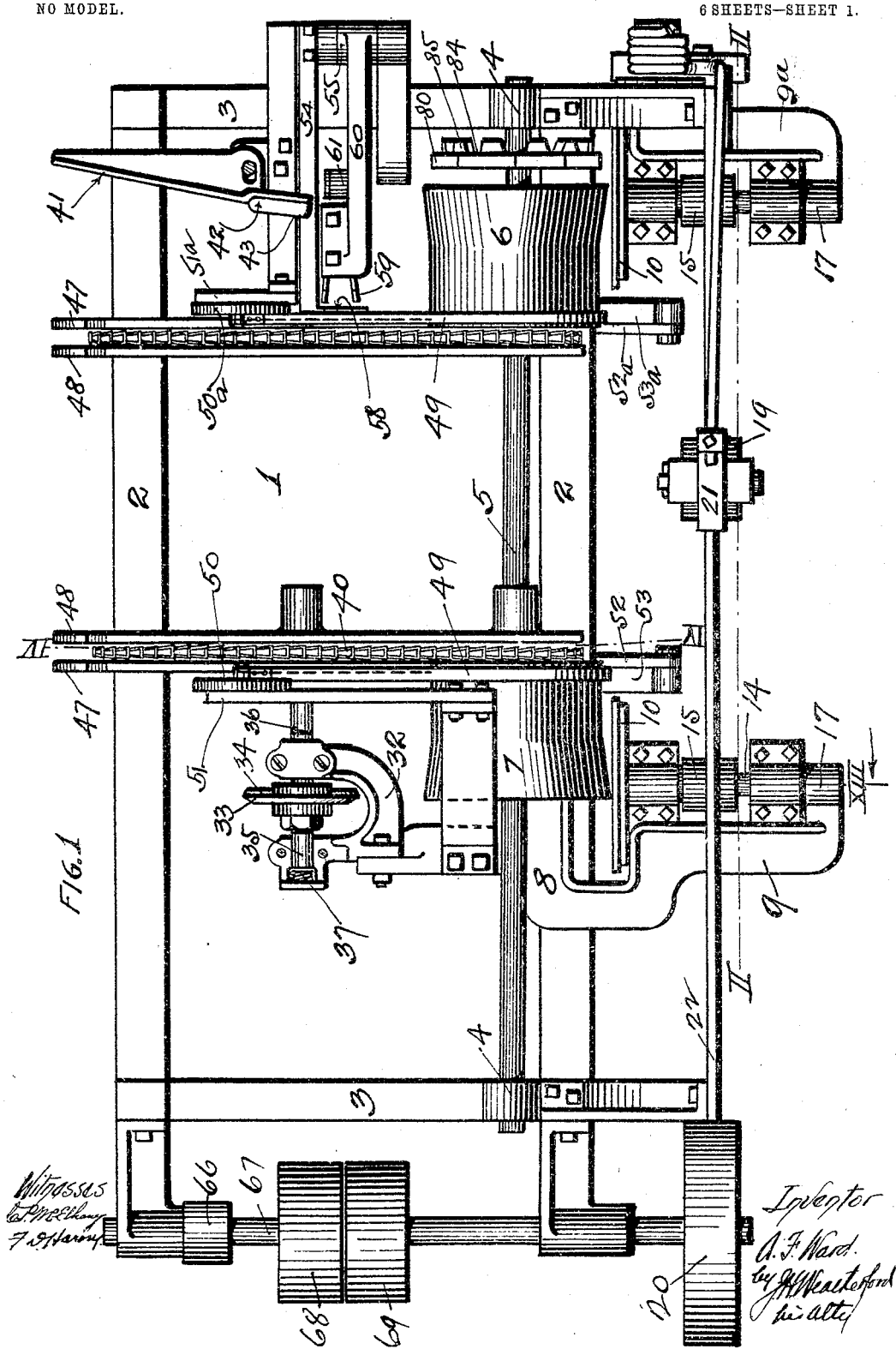

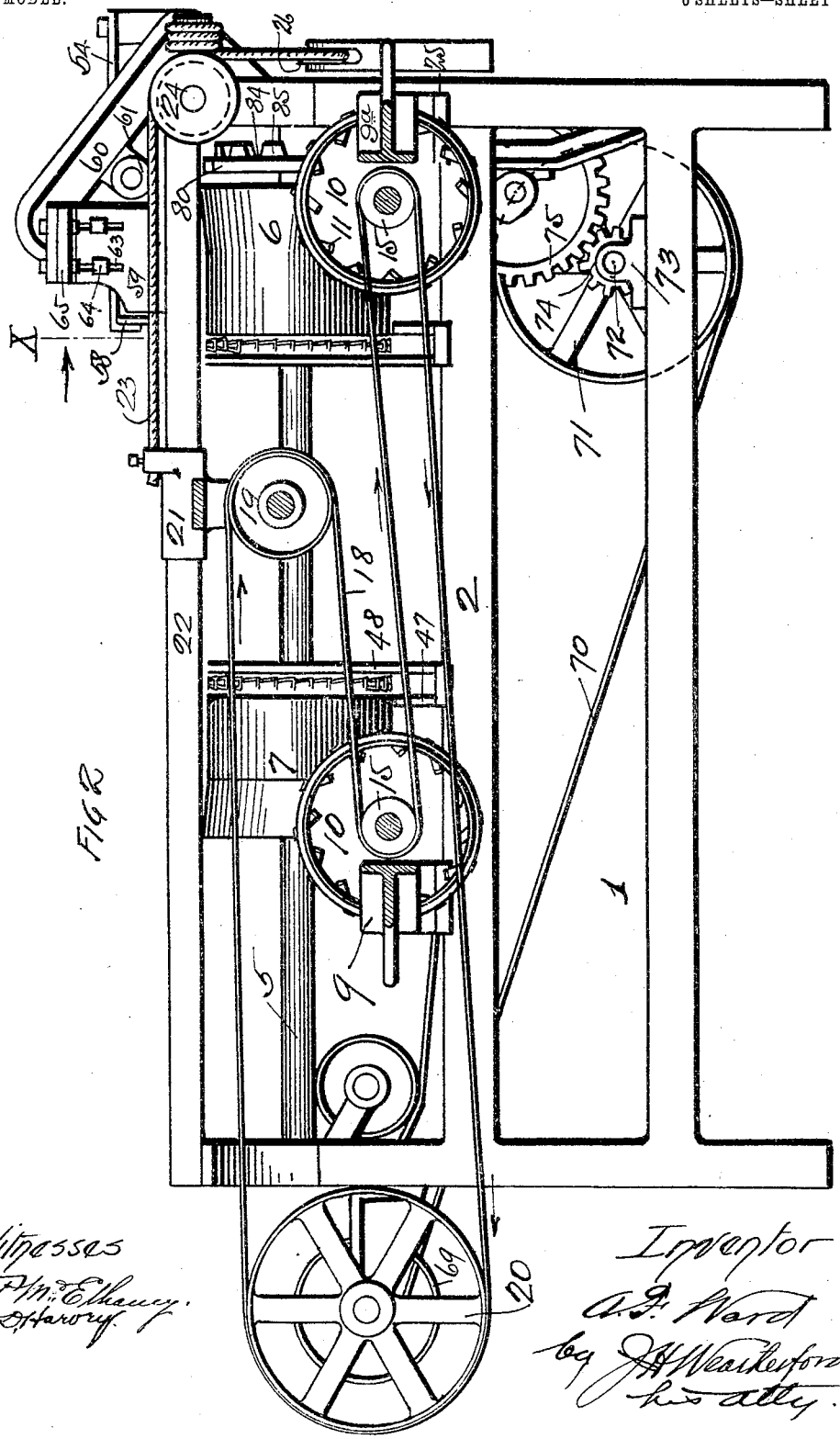

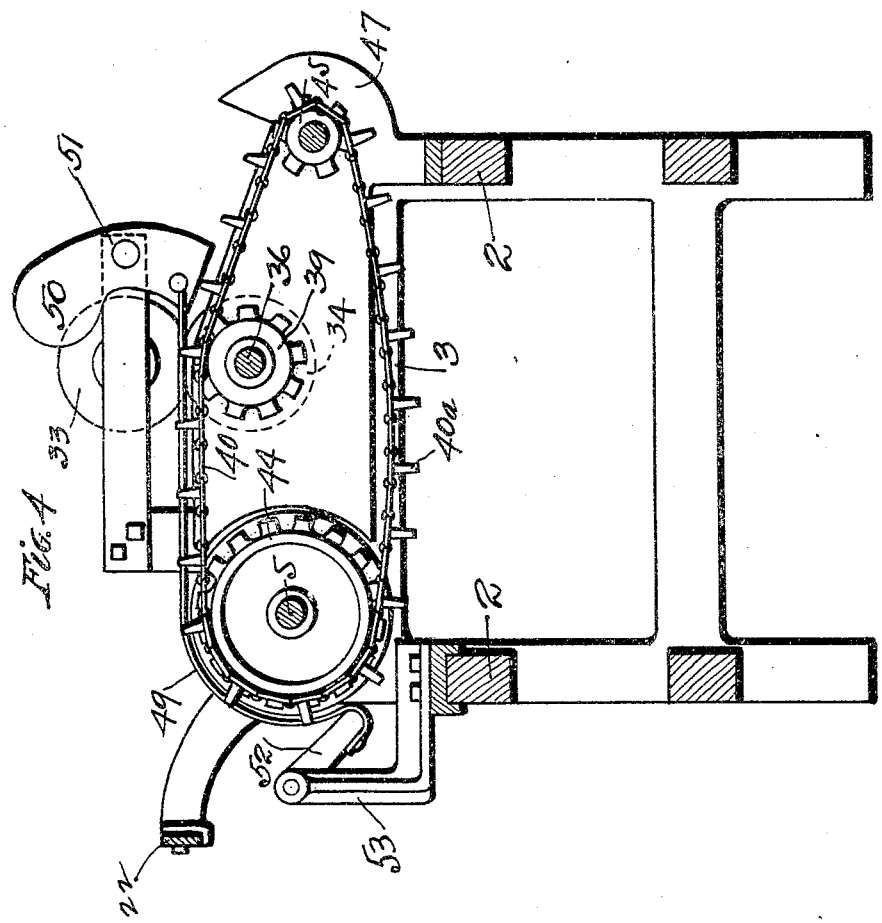

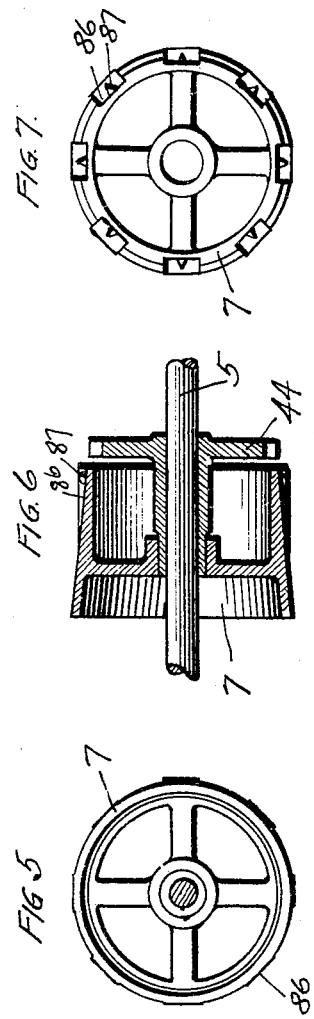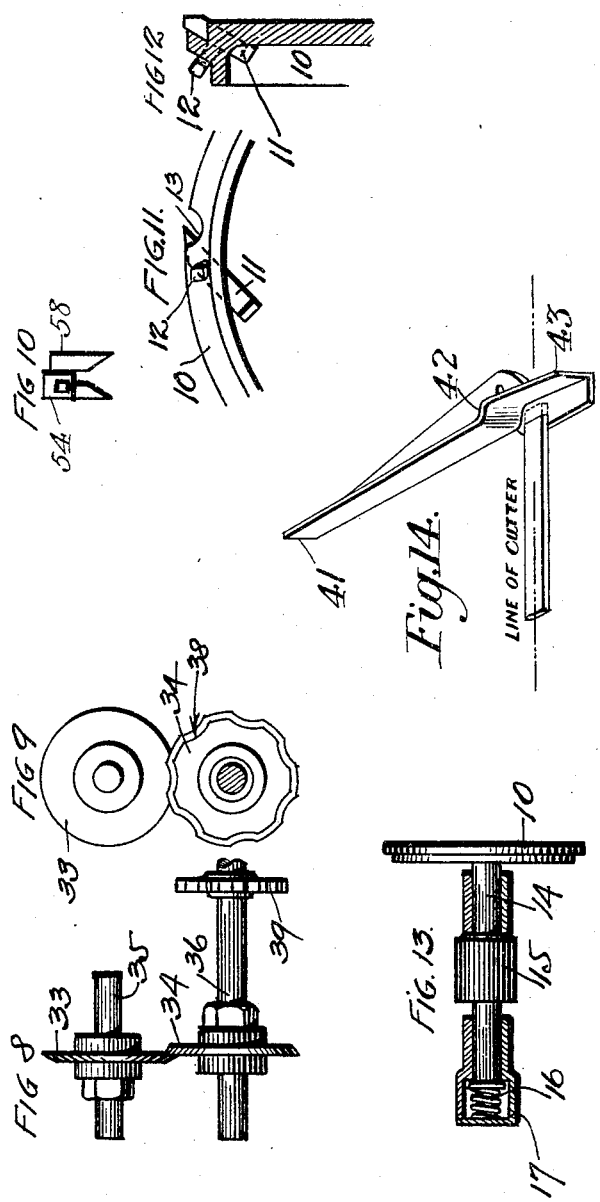

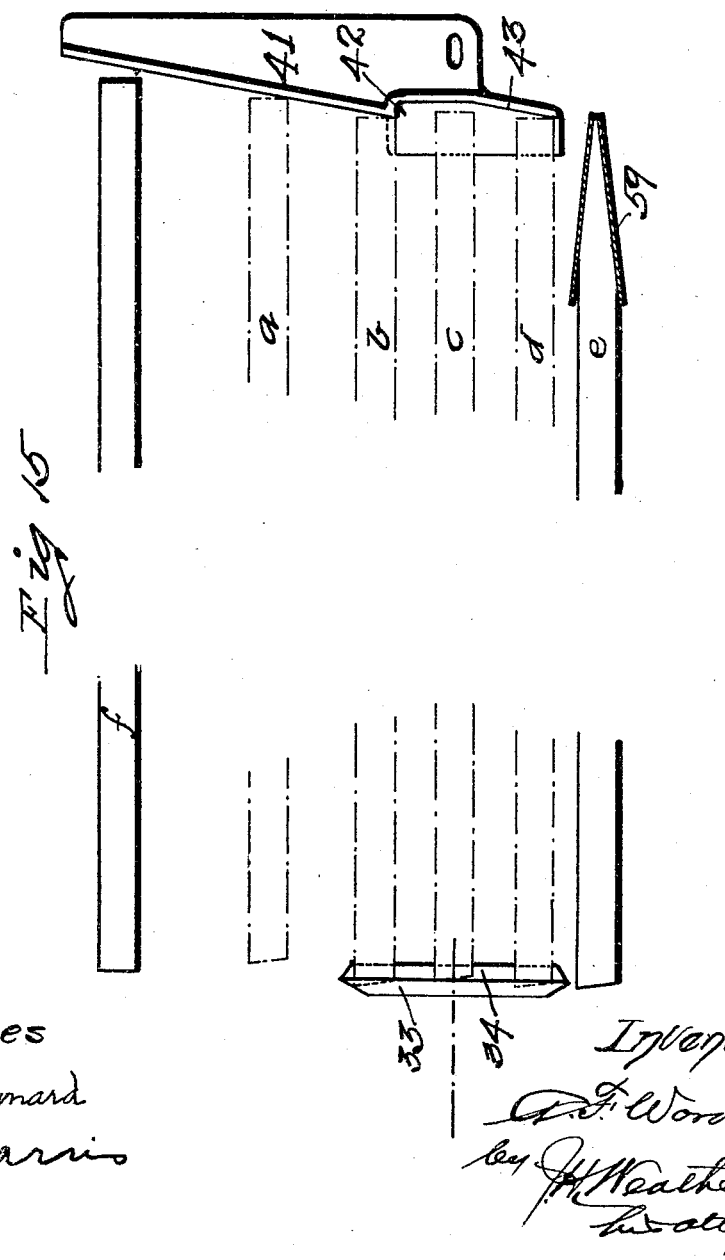

No. 774,216.

Patented November 8, 1904.

UNITED STATES PATENT OFFICE.

ALEXANDER F. WARD, OF MEMPHIS, TENNESSEE.

MACHINE FOR POINTING AND LAPPING HOOPS.

SPECIFICATION forming part of Letters Patent No. 774,216, dated November 8, 1904.

Application filed November 19, 1903. Serial No. 181,856. (No model.)

*To all whom it may concern:*

Be it known that I, ALEXANDER F. WARD, a citizen of the United States, residing at Memphis, Shelby county, State of Tennessee, have invented certain new and useful Improvements in Machines for Pointing and Lapping Hoops, of which the following is a specification.

This invention relates to certain new and useful improvements in a machine for pointing and lapping hoops, and relates especially to improvements in the details and construction of same.

The objects of my invention are, first, to provide means for adjusting the machine for different length hoops; second, to provide means for tightening the belt; third, to provide a simple and efficient cut-off device; fourth, to provide a pointer acting independently of the cut-off device; fifth, to provide a simple and efficient means for feeding the hoop to the lapper, and, sixth, to generally improve the details of the machine. I accomplish these objects as will be more fully hereinafter set forth in the drawings, specification, and claims.

In the drawings, Figure 1 is a plan view of the machine. Fig. 2 is a sectional side elevation taken on the line II II of Fig. 1. Fig. 3 is an end elevation of the right-hand end, as shown in Figs. 1 and 2, of the machine. Fig. 4 is a section on the line IV IV of Fig. 1. Figs. 5, 6, and 7 are detail end elevation, section, and end elevation, respectively, of the drum which carries the hoops while they are being lapped. Figs. 8 and 9 are side and end elevation, respectively, of the cut-off shear. Fig. 10 is a fragmentary view on the line X of Fig. 2 looking in the direction of the arrow, showing the hoop-centering device. Figs. 11 and 12 are an enlarged side view and section of the lapper-cutters and the head that carries them. Fig. 13 is a sectional view taken on the line XIII of Fig. 1 looking in the direction of the arrow and showing the spring which holds the lapper-head to its work. Fig. 14 is a perspective view of the hoop-guide 41, showing position of hoop with regard to the guide when the shear is acting on the opposite end. Fig. 15 is an enlarged plan view showing relative location of the cut-off shears, hoop-guide, and pointing-knives and showing the action of these mechanisms more especially on a hoop which is very slightly over-length.

Referring now to the drawings, in which like parts are represented by the same or like characters in all the views, the machine comprises a main frame 1, having side rails 2 and end rails 3. The end rails 3 carry bearings 4, in which a drum-shaft 5 is mounted. Near the right-hand end of the machine, as shown in Figs. 1 and 2, a drum 6 is mounted on the shaft 5 and fastened to same. Facing the drum 6 is a sliding drum 7, which is also mounted on the shaft 5 and which carries a key sliding in a spline (not shown) in the said shaft. This drum 7 is carried in a movable carriage 8, which is supported from the side rails 2 and slides on same.

An extension 9 of the carriage 8 carries a lapper-head 10, provided with cutters 11, preferably held by set-screws 12. Spaces 13 are cut away in front of the cutters 11 to allow clearance for chips. 14 is the lapper-head shaft, and 15 the drive-pulley for same. These heads are held to place by a spring 16 in a cup 17 and bearing against the end of the shaft, which spring allows a sufficient amount of play to prevent choking of the head, yet always brings the head back to place when the trouble is passed.

A bracket 9ª, corresponding to the bracket 9, is fixed to the frame 1 and extends out and supports a lapper-head 10 for the drum 6. These two lapper-heads 10 are driven by a single belt 18, which passes over the tightener 19, thence over the pulleys 15 and a drive-pulley 20. The tightener 19 is mounted in a sliding bracket 21, which is mounted on a rail 22 and is entirely independent of the drum and lapper-carriage 8. A cord 23 extends from the bracket 21 over a pulley 24 and carries an automatic tightener in the form of a weight 25, having a pulley 26, which rests in a bight in the cord 23, which cord is thence extended upward to a reel 27, on which it is wound. If desired, a link 28 is used to limit the motion of the weight.

29 is a handle for winding up the reel 27.

30 is a ratchet-pawl, and 31 a ratchet-wheel, for holding the reel when it is wound up.

A bracket 32, bolted to the carriage 8, carries the cut-off device. This device comprises top and bottom shear-disks 33 and 34, which are carried on shafts 35 and 36, respectively, the upper of which, 35, is provided with a spring 37 to hold it against its work. The lower shear 34 is provided with notches 38, which catch the hoop. The shaft 36, which carries the shear 34, also carries a sprocket-gear 39, which serves as an idler and guide-pulley for the feed-chain 40, which drives it. Opposite the cut-off shears 33 34 is a guide 41 for the end of the hoop. This guide is so shaped and placed that when a hoop reaches the point 42 it is in position to be cut off to its correct length. At this point the guide is cut away so that at the moment the shears catch it it is free to move longitudinally a limited amount. A hoop, therefore, too short to allow the shear to catch a firm hold is free to move enough to allow the hoop to clear the shear. Passing forward after being cut, the second guide 43 brings it back to its proper place for pointing. These points are clearly shown in Fig. 15, in which a hoop is shown in successive positions $a\ b\ c\ d\ e$. The hoop chosen for this illustration is practically of correct length, but is not cut quite square at one end, so that the shear does not get a firm hold to cut it off. Position $a$ shows the hoop just striking the guide 41. Position $b$ shows it positioned by the guide just before it enters the shear 33 34. It will be seen that the shear cannot get a good "bite" on the hoop and is therefore likely to push it endwise in the direction of the guide, which, as before stated, is cut away for this purpose. Position $c$ shows the hoop as pushed aside by the guide, and position $d$ shows it again brought into alinement by the guide 43 and ready for pointing. Position $e$ shows hoop being pointed.

$f$ shows a long hoop approaching the guide and one which would be firmly caught by the shear and in all probability would not be benefited by a cut-away guide such as shown.

The hoops are fed to the machine by the chains 40, which are driven by sprockets 44, carried by the drum-shaft 5.

45 is an idler-pulley over which the chain 40 passes. Lugs $40^a$ on the chains 40 carry the hoops forward.

Guides 47 48 are provided on which the hoops rest as they are carried forward by the chains 40. These guides are parallel and are spaced apart a sufficient distance for the chain to pass between them. They are exactly the same in shape, except that the guide 47 comes in line with the end of the drum and is cut away for same. From the guides the hoops pass beneath a flat strap 49, which holds it against the drum. This strap is fastened at one end to a counterbalance-weight 50, pivoted to the frame 51, (referring especially to Fig. 4,) carried by the carriage 8, and at the other end by an arm 52, pointing downward at an angle, so that the tension of the weight 50 will cause it to swing against the drum. This arm 52 is supported by a bracket 53, carried by the carriage 8. A similar weight $50^a$, arms $51^a$ and $52^a$, and bracket $53^a$, carried by the frame of the machine, are provided for the fixed drum.

54 is an arm pivoted at 55 and moved by a cam 56 on the shaft 57. This arm 54 carries a centering-piece 58. (Seen in detail in Fig. 10.) As the hoop is advanced by the chain 40 intermittently, as will be further explained, this centering-piece 58 is brought down as the chain stops and centers the hoop. Immediately after the hoop has been centered it is pointed by knives 59, carried by an arm 60, which is pivoted at 55 and is operated by a connecting-rod 61, which extends downward to a crank-arm 62 on the shaft 57. The knives 59 are provided with slots 63 and are held by bolts 64 to a block 65, bolted to the arm 60. This block is V-shaped, as shown in plan in Fig. 1, and holds the knives 59 at the proper angle to point the hoop before lapping it.

The drive for the drums 6 and 7, the sprocket-chains 40, the cut-off shears 33 34, the knives 59, and the centering-piece 58 comprise a pulley 66 on the shaft 67, driven by the tight pulley 68, (69 being a loose pulley,) which shaft also carries the drive-pulley 20, before mentioned. From this pulley 66 a belt 70 extends to a pulley 71, carried on a shaft 72, which shaft is mounted in bearings 73 in the frame 1. This shaft also carries a pinion 74, which meshes with a gear 75 on the shaft 57, which shaft, as before mentioned, carries a cam 56 and crank-arm 62, operating the centering device 58 and the pointing-knives 59. In addition this shaft carries a second crank-arm, 76, which through a connecting-rod 77, an arm 78, and a pawl 79 operates a ratchet-wheel 80, which ratchet-wheel is mounted on the shaft 5, which carries the drums 6 and 7. A cam 81 is also mounted on the shaft 57 and acts with a bell-crank lever 82, pivoted to the main frame at 83 to form a positive stop and release for a face-wheel 84, having projections 85, extending outward from its face. The cam 81 is set in advance of the crank-arm 76, so that it throws the lever 82 out of engagement with the lugs 85 just as the ratchet-pawl 79 is brought to its lowest position, and it is so shaped that it will release the bell-crank arm and allow it to lock the plate 84 just after the ratchet-pawl 79 has reached its highest position. Since now the sprocket-wheel 44 and the drums 6 and 7 are also fastened to the shaft 5, it follows that the sprocket and drums, the sprocket-chain, and the mechanism operated by said chain will all receive an intermittent motion from the ratchet-wheel 80.

86, Figs. 6 and 7, represents seats in the drums, which are arranged to catch the hoops and carry them to the lapper-heads. As shown, these seats are inclined to the axis of the drum on the same angle as the conical portion of the drum. These seats are provided with spurs 87, which stick into the hoop when same is brought against the seats and hold it against longitudinal movement.

The operation of the machine is as follows: Hoops are fed on the guides 47 48 and are picked up by the sprocket-chain 40 and moved forward intermittently by same. The guide 41 moves the hoop longitudinally into line and the cut-off shears 33 34 catch and cut it to its proper length. The hoop then passes under the pointing-knives 59, the action of the mechanism being so timed that the chain comes to a full stop and brings the hoop to a stop immediately beneath them. The centering-piece 58 comes down and centers the hoop. Immediately following this the knives 59 descend and point the hoops. The centering device 58 remains down till the knives catch the hoop, then begin to rise, and when the knives have pointed the hoops they, too, are raised clear of same. It will be especially noted in this connection that the hoops are cut off to their proper length before the pointing is done, that a release is provided in the guide 41 to prevent hoops which are practically of the correct length from binding while they are being cut off, that the hoops are brought after cutting off to the proper position for the pointing-knives to act on them correctly by the second guide, 43, and that the pointing being done after the cutting off and not simultaneously therewith there is no danger of the hoops being jammed into the pointing device so tight that it will bind against same and that trouble will be experienced in releasing same and the consequent extra wear on the face of the pointing-knives is obviated. As the knives 59 clear the hoop the chain 40 is again put in motion and the hoops move forward under the strap 49 to the drums 6 and 7. It is caught by the seats 86 in the drum and by the spurs 87 projecting upward from these seats. It is held down by the straps 49 and is moved forward not only by the drum, but by the lugs on the feed-chain and is carried around to the lapping-heads 10, which, as will be noted by the proportion of the pulleys 15 and 20, are driven steadily at a rapid rate. These lapping-heads are provided, as before mentioned, with cutters which project slightly beyond the face and periphery of the drum, but not sufficient to enable them to catch such a hold on the hoop as to move it longitudinally. This latter motion of the hoop is especially provided against, however, by the spurs 87, before mentioned. After being lapped the hoops drop straight down from the lappers outside the frame of the machine. Suitable guides can of course be provided, if so desired, to carry these hoops out from the machine, allowing them to come clear from the refuse. In this connection especial attention is called to the vertical position of the lapper-heads, by which the material acted on by them is carried away from them by gravity and clogging is thereby prevented.

It will be especially noted that the lapper-heads are driven by a single belt kept under uniform tension by the weight 25 and that at any time the tension on the belt can be relieved by simply releasing the cord-reel. It will be noted, too, that the tension is not only uniform, but that it cannot be varied from this tension by a careless attendant.

Having now fully described my invention, what I claim, and desire to secure by Letters Patent of the United States, is—

1. In a machine for lapping hoops, the combination with a feed-chain having lugs thereon, of a rotary shear comprising a cutting-disk driven by said feed-chain, said disk having notches located in its periphery, and coacting with the lugs on said feed-chain.

2. In a machine for pointing and lapping hoops, the combination with lapper-heads and means for driving same, of feed-drums provided with recesses to carry the hoops, spurs projecting from said recesses into the hoops and means of driving said drums, substantially as shown and described.

3. In a machine for lapping hoops, the combination with lapper-heads and means of driving same, of feed-drums provided with longitudinal seats inclined toward the axis of said drums and means of driving said drums.

4. In a machine for lapping hoops, the combination with lapper-heads and means of driving same, of feed-drums provided with longitudinal seats inclined toward the axis of said drums and spurs projecting from said seats.

5. In a machine for lapping hoops, the combination with lapper-heads and means of driving same, of feed-drums provided with longitudinal seats inclined toward the axis of said drums, arms each pivoted at one end, a strap extending partially around each of said drums, and attached to the free end of said swinging arm between the point of support of said arms and said drums and a tension-weight on the opposite end of each strap.

In testimony whereof I have signed my name to this specification in the presence of two subscribing witnesses.

ALEXANDER F. WARD.

Witnesses:
W. H. TAYLOR,
G. W. MILLER.